United States Patent [19]

Forrest et al.

[11] Patent Number: 5,201,620
[45] Date of Patent: Apr. 13, 1993

[54] CUTTING TOOL HOLDING ASSEMBLY

[75] Inventors: David Forrest; Keith A. Jones, both of Longford; Dennis A. Butler, Coventry, all of England

[73] Assignee: Morris Tooling Limited, England

[21] Appl. No.: 842,026

[22] Filed: Feb. 25, 1992

[30] Foreign Application Priority Data

Feb. 26, 1991 [GB] United Kingdom ............ 9103930
Oct. 9, 1991 [GB] United Kingdom ............ 9121373

[51] Int. Cl.$^5$ ............................ B23B 31/02
[52] U.S. Cl. ..................... 409/232; 408/239 R
[58] Field of Search ............ 279/89, 93, 94, 138; 408/238, 239 R, 239 A; 409/232, 234

[56] References Cited

U.S. PATENT DOCUMENTS

| 4,274,774 | 6/1981 | Haga et al. ............ 409/232 |
| 4,585,380 | 4/1986 | Naito ................... 409/234 |
| 4,655,631 | 4/1987 | Mitchell ............... 409/232 |
| 4,906,147 | 3/1990 | Friesinger et al. ...... 409/234 |

FOREIGN PATENT DOCUMENTS

| 107747 | 7/1982 | Japan ............... 408/238 |
| 209735 | 11/1984 | Japan ............. 408/239 R |
| 265579 | 12/1949 | Switzerland ........ 408/238 |
| 816542 | 7/1959 | United Kingdom ..... 408/238 |

Primary Examiner—Daniel W. Howell
Attorney, Agent, or Firm—Gifford, Groh, Sprinkle, Patmore and Anderson

[57] ABSTRACT

A cutting tool holding assembly is arranged for rapid replacement of cutting tools on machine tools. The assembly includes an adaptor for locating a tool holder in a drive spindle. The adaptor has a base member which is secured in the spindle and a body member which is secured releasably to the base member. The tool holder is secured to the body member. The base member is secured in the base of a bore in the spindle and the body member is releasably secured against rotation relative to the spindle.

9 Claims, 2 Drawing Sheets

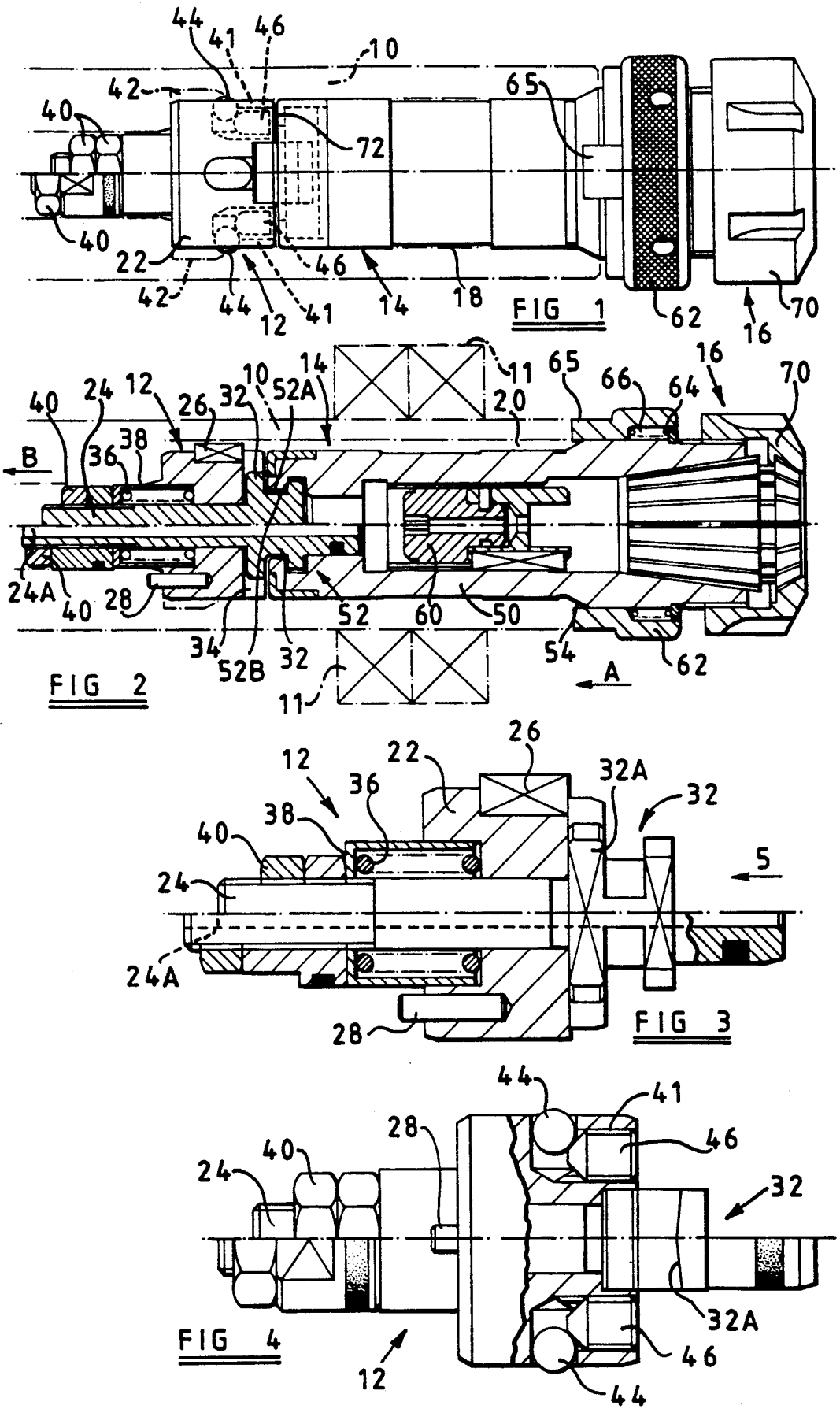

CUTTING TOOL HOLDING ASSEMBLY

This invention relates to a tool holding assembly and in particular to an adaptor for interconnecting a cutting tool holder and a drive spindle of a machine tool.

Multiple spindle machine tools are used to machine successively and simultaneously work pieces, such as engine castings. Such apparatus operates continuously and the cutting tools wear and must be replaced quickly and without risk of improper placement.

In U.S. Pat. No. 4,585,380 there is described a device for attaching a tool to the spindle of a machine tool in which the tool and tool holder can be replaced from the outer, operative end of the spindle. For this purpose the spindle is formed with a central opening having at an inner, closed end a securing member secured to the spindle and arranged to locate and secure the body or adaptor of the device on which a tool is mounted. Such device has operational difficulties for the user and it is an object of the invention to provide an improved tool to spindle securing assembly.

According to the invention a cutting tool assembly includes a tool holder, a drive spindle with a central bore and an adaptor for locating a tool holder in the drive spindle, the adaptor comprising a base member arranged to be secured against removal from the spindle, a body member having first securing means for securing the body member releasably to the base member and second securing means for securing the tool holder to the body member, the base member being secured in the base of the bore of the spindle and the body member being releasably securable against rotation relative to the spindle, the base member being of two part construction having a first part secured in the base of said bore and a second part secured to the first part, the first and second parts having interposed between the parts resilient means whereby the parts are relatively movable in the axial direction of the spindle.

Preferably the resilient means urges the second part in a direction towards the base of the bore and the extent of relative movement is limited in each direction.

Conveniently the resilient means comprises spring means located between the first and second parts of the base member and the first part is secured in a fixed position in said spindle, the second part being movable relative to the first part under the restraint of said resilient means.

Preferably said first securing means secures the body member to the second part of the base member. Said second part may include a nose which is engageable with a seating formed in the body and secured by relative rotational movement of the body member and the base member. Conveniently the nose and the seating define between them cam surfaces to draw the body member towards the base member against the action of said resilient means.

Preferably the body member carries a sleeve releasably engageable with the spindle to prevent rotation of the body member relative to the spindle when the body member is secured by said first securing means. Engagement of the sleeve with the spindle may be by interengaging dogs.

Conveniently said sleeve is movable axially of the assembly and is resiliently biased towards said engagement position, the sleeve and the spindle comprising interengaging dogs.

In one arrangement the seating includes an entry portion and a locking portion, the nose being located in the entry portion and then secured in the locking portion by relative rotation between the body member and the base member.

Preferably the first part of the base member is secured in the spindle by radially outwardly movable members carried by the first part which are selectively engageable with the walls of the bore of the spindle.

An embodiment of the invention will now be described in detail by way of example only, and with reference to the accompanying drawings, in which:

FIG. 1 is a diagrammatic side elevation of a tool holding assembly of the invention;

FIG. 2 is a diagrammatic sectional view of the assembly of FIG. 1;

FIG. 3 is a detailed part-sectional view of the base member of the invention;

FIG. 4 is a detailed side elevation of FIG. 3;

Figure 5:
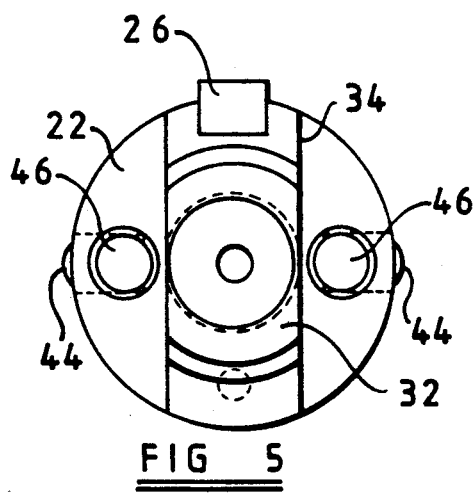
FIG. 5 is an end view in the direction of arrow 5 in FIG. 3.

FIG. 1 and FIG. 2 show a spindle, generally designated 10, having assembled to the spindle a locating base member 12, an adaptor or body member 14 and a tool holder 16. The spindle 10 is provided with a central bore 18, and optionally with a key-way 20 along its length into which bore 18 the base member 12 is fitted and the adaptor 14 is releasably located.

The base member 12 (as shown in detail in FIG. 3 and FIG. 4) comprises two parts, a cylindrical block 22 and a central bore member 24 extending therethrough and a pin 28 positioned at the end of the base member 12. The pin 28 is received by a correspondingly formed location hole in the base of the bore 18 of the spindle 10 and serves to orientate the base member 12 relative to the spindle 10. An alternative location member to the pin 28 may be used in the form of a key 26 and this is received by the key-way 20 in the bore 18. Formed integrally with the bore member 24 and directly above the base 12 is a nose 32. The nose 32 has a location portion 32A which is parallel-sided and extends diametrically across the base member 12.

The cylindrical block 22 and central bore member 24 are secured together prior to being located into the central bore 18. This is achieved by the nose 32A locating in a slot 34 formed diametrically across the upper surface of the block 22. Once located in the slot 34, the member 24 is prevented from any rotational movement relative to the cylindrical block 22. The central bore member 24 is secured within the block 22 by the use of a compression spring 36, located by a sleeve 38 and nut 40 on the member 24. The spring 36 locates around the member 24 and between the member 24 and the base member 12 to urge the members 12 and 24 apart and allowing some relative movement therebetween. The spring 36 bears against the base of the block 22 and thus the bore member 24 is secured in relation to the block 22. The spring 36 urges the receiving surface 30 and nose 32 in a direction away from the adaptor 14 (as shown by arrow B) and provides the central bore member 24 with a degree of relative axial movement which aids the locating of the nose 32 to the adaptor 14. The sleeve 38 is adjustable in the axial direction and acts to limit the relative axial movement between the members 12 and 24.

The bore member 24 may provide a coolant passage 24A through the cylindrical block 22 and in this case the members 24 extend beyond the nose 32 to engage a corresponding bore in an adjustable element 60 mounted centrally within the adaptor 14. The coolant flows up the bore 24A in the member 24, through the adaptor 14 and into the tool holder 16. This is as shown in the lower halves of FIGS. 1–7. In the upper halves of these drawings the coolant passages are omitted.

Positioned at opposite sides of the block 22 are two L-shaped openings 41. The L-shaped openings each have a radially directed portion which extends towards an annular groove 42 formed around the internal wall of the spindle bore 18. The openings each accommodate a ball-bearing 44 which is positioned so as to be able to protrude from the cylindrical outer surface of the base member 12 into the annular groove 42 to locate and secure the member 12 in relation to the spindle 10. The other limb of each L-shaped opening 40 is screw-threaded for receiving a correspondingly threaded grub screw 46, the inner end of which is engageable with the associated ball 44 in order to move the ball radially outwards.

The adaptor 14 as shown in FIG. 1 and FIG. 2 has a tubular body 50 which is a close fit in the spindle bore 18. The body 50 is provided with a channel 52 which is located at the inner end of the body and which receives the nose 32 and provides a seating for and serves to secure the nose 32 of the base member 12. The channel 52 is formed with an entry portion 52A and seating portions 52B each shaped to receive the nose 32, the entry portion 52A extending diametrically across the inner end, and the seating portions 52B being arcuate slots at opposite sides of the channel 52. The surfaces 32A of the nose which engage with the seatings 52B are of cam profile, as seen in FIG. 4.

Towards the other, outer end of the body 50 there is provided a tapered seating 54 which engages and seats the body 50 relative to the spindle 10. Alternatively, the body 50 is provided with angular square section seatings (not shown) which would engage and seat on a corresponding formed shoulder on the spindle 10.

At the outer end of the adaptor 14 there is releasably secured a tool holder 16. An axially adjustable element 60 mounted centrally within the adaptor 14 provides a seating for the end of a tool (not shown) located in the tool holder 16 mounted within the adaptor 14. A spring biased knurled sleeve 62 having two driving dogs 65 located at diametrically opposed sides of the sleeve 62 is carried on the adaptor 14. The sleeve 62 is provided with springs 64 located in an annular opening 66 which bias the sleeve 62 in a direction away from the tool holder 16 as indicated by arrow A. The driving dogs 65 extend through slots in the adaptor 14 and are received in corresponding openings in the spindle 10 when the adaptor 14 is fully assembled with the base 12. The rotational drive required to operate the tool secured in the tool holder 16 is taken up from the spindle 10 through the drive dogs 65 alone and not through the base 12.

In order to fit the base 12 into the spindle 10, the base 12 is slid into the spindle bore 18 with the pin 28 in engagement with its location hole or the key 26 in engagement with the key-way 20. This ensures that the base 12 is correctly orientated relative to the spindle bore 18 so that the adaptor 14 can be secured to the base 12 once it is located in the spindle 10. When located in the correct position in the bore 18 of the spindle 10, the base 12 is then securely fixed against withdrawal from the spindle 10 by screwing down the grub screws 46 so that they act on the ball bearings 44 urging them radially outwards to engage in the annular groove 42. This serves to lock the base 12 in position.

In order to fit and secure the adaptor 14 in the spindle 10, the body 50 is placed into the spindle bore 18 until the surface 72 of the body 50 approaches nose 32. The body 50 is oriented until the nose 32 enters the channel 52. In this position the nose 32 is located in the receiving portion 52A. The adaptor 14 is pushed in against the action of the spring 64 until the nose is in the seating portion 52B. The adaptor 14 is then rotated so that the nose 32 is held in the portion 52B. At this point the dogs 65 of the knurled sleeve 62 had been engaging against the top end of the spindle 10. The rotation of the adaptor 14 through 90° causes the dogs 65 of the sleeve 62 to be urged by the spring 64 and moved in the axial direction into position in the corresponding openings in the spindle 10. Thus the adaptor 14 is held firmly for rotation with the spindle 10 by the dogs 65, the bias of the spring 64 retaining the dogs 65 in the spindle openings.

The spindle is conventionally located in bearings 11, as shown in FIG. 2, in the machine tool.

In use, the tool holder 16 is fitted with the required tool in a conventional manner by a nut 70 which is unscrewed from the adaptor 14. The tool is placed into the jaws of the tool holder 16 and the nut 70 is screwed back down onto the adaptor 14 to secure the tool. Other tool holding means than the nut 70 and holder 16 can be used.

Figure 6:
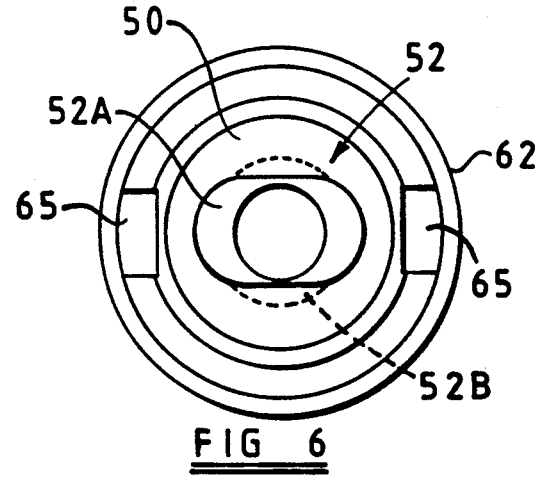
FIG. 6 is an end view of an adaptor part of the assembly.
Figure 7:
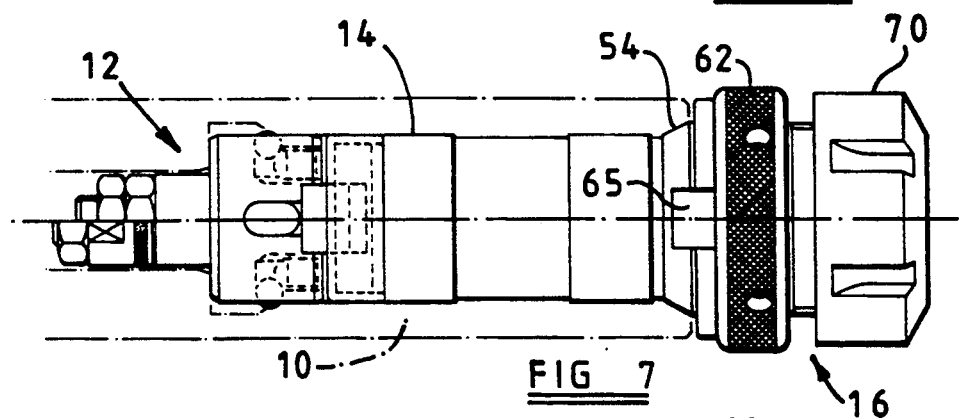
FIGS. 7-9 are diagrammatic side elevations of the assembly of FIG. 1 showing the steps involved in locating the adaptor in a spindle.
Figure 8:
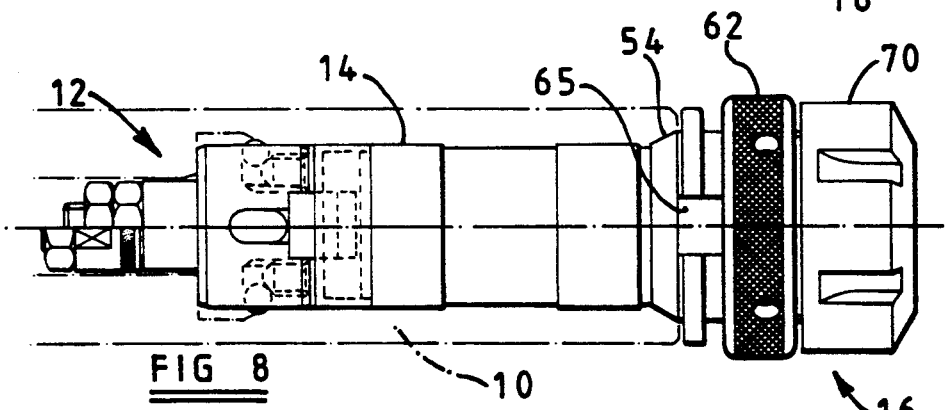
Figure 9:
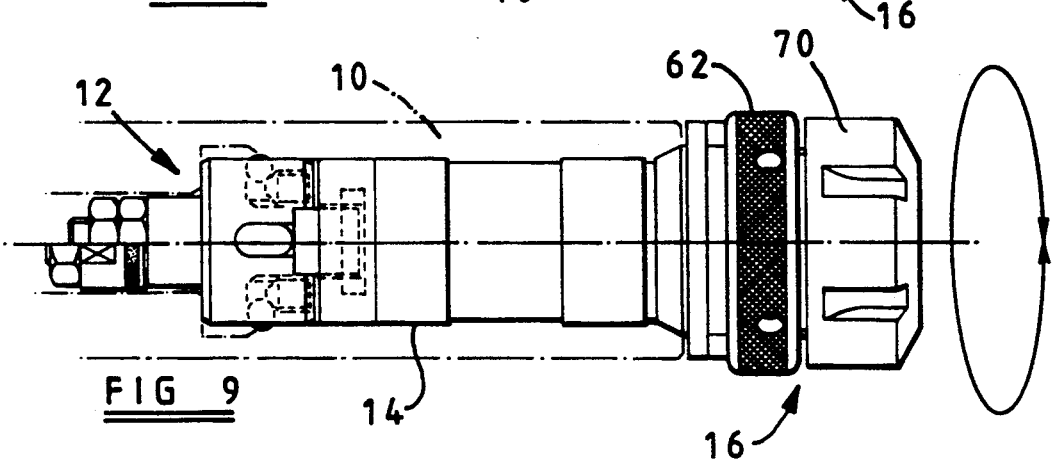

To remove a drill holder from the spindle 10 as shown in FIGS. 7 to 9 the dogs 65 are drawn out of the corresponding openings in the spindle 10 against its spring bias by axial movement of the sleeve 62 and the sleeve 62 is rotated through 90° (as shown in FIGS. 5 to 7). The nose 32 is disengaged from the seating 52B and the adapter 14 can be released, removed and replaced without delay.

We claim:

1. A cutting tool assembly including a tool holder, a drive spindle with a central bore and an adaptor for locating the tool holder in the drive spindle, the adaptor comprising a base member arranged to be secured against removal from the spindle, a body member having first securing means for securing the body member releasably to the base member and second securing means for securing the tool holder to the body member, the base member being secured in the base of the bore of the spindle and the body member being releasably securable against rotation relative to the spindle, the base member being of two part construction having a first part secured in the base of said bore and a second part secured to the first part, the first and second parts having interposed between the parts resilient means whereby the parts are relatively movable in the axial direction of the spindle, wherein the resilient means is arranged to urge the second part in a direction towards the base of the bore, and further comprising stop means whereby the extent of said relative movement is limited in each direction.

2. An assembly according to claim 1 wherein the resilient means comprises spring means located between the first and second parts of the base member, the first part being secured in a fixed position in said spindle in use, the second part being movable relative to the first part under the restraint of said resilient means.

3. An assembly according to claim 1 wherein the body member carries a sleeve releasably engageable with the spindle to prevent rotation of the body member relative to the spindle when the body member is secured by said first securing means.

4. An assembly according to claim 3 wherein said sleeve is movable axially of the assembly and is resiliently biased towards said engagement position, the sleeve and the spindle comprising interengaging dogs.

5. An assembly according to claim 1 comprising location means for orienting the base member in the bore of the spindle relative to the axis of the assembly.

6. A cutting tool assembly including a tool holder, a drive spindle with a central bore and an adaptor for locating the tool holder in the drive spindle, the adaptor comprising a base member arranged to be secured against removal from the spindle, a body member having first securing means for securing the body member releasably to the base member and second securing means for securing the tool holder to the body member, the base member being secured in the base of the bore of the spindle and the body member being releasably securable against rotation relative to the spindle, the base member being of two part construction having a first part secured in the base of said bore and a second part secured to the first part, the first and second parts having interposed between the parts resilient means whereby the parts are relatively movable in the axial direction of the spindle, wherein said first securing means secures the body member to the second part of the base member and said second part includes a nose portion which is engageable with a seating formed in the body.

7. An assembly according to claim 6 wherein the nose portion and the seating define between them cam surfaces and the body is secured to the nose portion by relative rotational movement between the body and the base member to draw the body member towards the base member against the action of said resilient means.

8. An assembly according to claim 6 wherein the seating includes an entry portion and a locking portion, and the nose portion of the second part of the base member is located in the entry portion and then secured in the locking portion by relative rotation of the body member and the base member.

9. A cutting tool assembly including a tool holder, a drive spindle with a central bore and an adaptor for locating the tool holder in the drive spindle, the adaptor comprising a base member arranged to be secured against removal from the spindle, a body member having first securing means for securing the body member releasably to the base member and second securing means for securing the tool holder to the body member, the base member being secured in the base of the bore of the spindle and the body member being releasably securable against rotation relative to the spindle, the base member being of two part construction having a first part secured in the base of said bore and a second part secured to the first part, the first and second parts having interposed between the parts resilient means whereby the parts are relatively movable in the axial direction of the spindle, and further comprising radially outwardly movable members carried by the first part of the base member which are selectively engageable with the walls of the bore of the spindle whereby the base member is secured in the bore in the spindle.

* * * * *

UNITED STATES PATENT AND TRADEMARK OFFICE
CERTIFICATE OF CORRECTION

PATENT NO. : 5,201,620
DATED : April 13, 1993
INVENTOR(S) : David Forest, Keith A. Jones and Dennis A. Butler It is certified that error appears in the above-indentified patent and that said Letters Patent is hereby corrected as shown below:

Column 1, line 65, delete "of" and insert -- in --.

Column 2, line 40, delete "orientate" and insert -- orient --.

Column 3, line 67, delete "orientated" and insert --oriented --.

Signed and Sealed this

Twenty-third Day of November, 1993

Attest:

BRUCE LEHMAN

Attesting Officer     Commissioner of Patents and Trademarks